United States Patent [19]

Woods

[11] 3,759,188

[45] Sept. 18, 1973

[54] VARIABLE SPEED CONVEYOR

[75] Inventor: Harry E. Woods, Akron, Ohio

[73] Assignee: The Goodyear Tire & Rubber Company, Akron, Ohio

[22] Filed: Jan. 4, 1971

[21] Appl. No.: 103,656

[52] U.S. Cl. .................. 104/168, 198/110, 198/127

[51] Int. Cl. .................. B61b 13/00

[58] Field of Search .................. 214/84; 198/16, 110, 198/127, 181; 104/18, 25, 134, 168

[56] References Cited

UNITED STATES PATENTS

| | | | |
|---|---|---|---|
| 325,386 | 9/1885 | Bliven | 104/75 |
| 1,960,307 | 5/1934 | Fisk | 198/127 R |
| 2,701,049 | 2/1955 | Kendall | 198/127 R |
| 747,090 | 12/1903 | Schmidt | 104/25 |
| 3,342,309 | 9/1967 | Hollyday | 198/110 |
| 3,266,618 | 8/1966 | Hundertmark | 198/127 R |
| 3,189,162 | 6/1965 | Brundell | 198/127 R |

*Primary Examiner*—Gerald M. Forlenza
*Assistant Examiner*—D. W. Keen
*Attorney*—F. W. Brunner and Oberlin, Maky, Donnelly & Renner

[57] ABSTRACT

A conveying system for accelerating or decelerating passenger or load carrying platforms in which driving rollers, having a substantially conical shape, support rails mounted under the platform and a change in speed of the platform is obtained by changing the points of engagement of the rails with the rollers. The rails may be pivotally mounted on the platforms or the rails may be fixedly mounted in a canted position to engage adjacent rollers at surfaces moving at the same peripheral speed.

17 Claims, 7 Drawing Figures

INVENTOR.
HARRY E. WOODS

BY

Oberlin, Maky, Donnelly & Renner
ATTORNEYS

INVENTOR.
HARRY E. WOODS

BY

Oberlin, Maky, Donnelly & Renner
ATTORNEYS

VARIABLE SPEED CONVEYOR

This invention relates generally as indicated to the acceleration and deceleration sections of a passenger or load carrying conveying system where it is desirable to smoothly change the speed of the passenger or load carrying platforms from a high-speed section to a low-speed section where loading and unloading can be done.

A passenger carrying system of the type referred to is shown in U.S. Pat. No. 2,905,100, dated Sept. 22, 1959 and filed Aug. 1, 1955. A speed adjusting conveyor for providing acceleration and deceleration of the passenger carrying cabs of the type referred to is disclosed in U.S. Pat. No. 2,701,049, dated Feb. 1, 1955 and filed June 7, 1951. Both of these patents are assigned to the assignee of this application and a passenger conveying system built in accordance with the disclosures in these patents has been built and operated successfully. It has been found that the speed adjusting mechanisms of this system and other systems are complex and as such have a substantial initial cost and require careful maintenance of the slip clutches and other moving parts.

With the foregoing in mind it is the principal object of this invention to provide a variable speed conveyor for accelerating and decelerating a passenger or load carrying platform with a minimum of slippage and without slip clutches.

Another object is to provide a supporting rail under the load carrying platform for engagement with the driving rollers at surfaces having the same peripheral speed.

A further object of the invention is to provide a series of rollers having a substantially conical shape for engagement with the rails on the platform.

A still further object of the invention is to provide a pivotal connection of the rails to the platform and mechanism for swinging the pivotally supported rails into engagement with different areas of the conical rollers.

Another object of the invention is to provide driving rollers turning at progressively higher or lower speeds and canted rails engaging the substantially conical rollers at points where the peripheral speeds of the rollers are the same.

These and other objects of the present invention may be achieved by providing a load-carrying or passenger-carrying platform having rails mounted on the underside for engagement with a series of driving rollers. The rollers have a substantially conical shape so that by engagement of the rails with different areas of the rollers, different peripheral speeds are obtained for driving the rails. The rollers are driven at different speeds and the rails are canted so that the rails contact surfaces having the same peripheral speed and thereby substantially eliminate slippage between the rollers and the rails. By canting the rails in different directions and directing the platform over rollers rotating at progressively increasing or progressively decreasing speeds, acceleration or deceleration may be obtained. In a modification of this invention the rails may be pivotally mounted so as to move transversely of the conveyor and engage rollers at surfaces of different peripheral speed.

To the accomplishment of the foregoing and related ends, the invention then comprises the features hereinafter fully described and particularly pointed out in the claims, the following description and the annexed drawings setting forth in detail a certain illustrative embodiment of the invention and a modification thereof, this being indicative, however, of but some of the various ways in which the principles of the invention may be employed.

Figure 1:
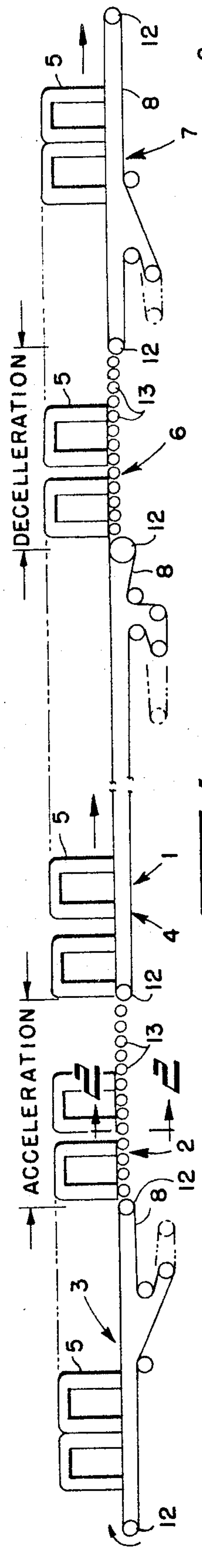
FIG. 1 is a schematic side elevational view of a portion of a typical modern passenger conveyor system incorporating the preferred form of mechanism for accelerating and decelerating passenger carrying cabs.

Referring to FIG. 1, there is schematically shown a typical passenger conveyor system 1 having an acceleration section 2 between a low speed section 3 and a high speed section 4 for increasing the speed of passenger carrying cabs 5 from the low speed at which loading and unloading takes place to the high speed at which the cabs are carried from station to station.

At the other end of the high speed section 4 is a deceleration section 6 for reducing the speed of the cabs 5 to the speed of a second low speed section 7 which may be located at another station and provide for unloading and loading of the passengers from the cabs 5. The low speed sections 3 and 7 and the high speed section 4 may have endless belts 8 carried by pulleys 12 in a manner well known in the art.

In the acceleration section 2 the cabs 5 are supported on driving rollers 13 extending transversely of the predetermined path over which the cabs are conveyed and the rollers are spaced apart longitudinally of the path so that each of the cabs 5 is supported by more than one of the driving rollers 13. As shown more clearly in FIGS. 2, 3 and 4, each of the cabs 5 has a supporting platform 14 for carrying passengers or other objects and side members 15 at the edges of the platform for enclosing the cabs. The longitudinally extending side members 15 extend downwardly from the platform 14 providing flanges 16 for engagement with the belts 8 with the platform in a raised position providing a space beneath the platform for supporting rails 17 and 18 which are mounted on the underside of the supporting platform 14 by brackets 19 as by welding of the brackets to the rails and to the platform.

The driving rollers 13 which are in supporting engagement with the supporting rails 17 and 18 are mounted on shafts 23 extending through bearings rotatably mounted in longitudinally extending structural members such as channels 24 and 25 which are fixed to a supporting frame 26 of the acceleration section 2.

Each of the shafts 23 is connected through a coupling 27 to a speed controlling apparatus such as speed reducers 28 which may be interconnected with each other by connecting shafts 32 and couplings 33 with a final connection to a power source such as an electric motor, not shown.

To constrain the transverse movement of the cabs 5 along the acceleration section 2, longitudinal members such as angles 34 are mounted on the channels 24 and 25 for engagement with cam rollers 35 which are rotatable about vertically extending pins 36 held in brackets 37 mounted on the underside of the platform 14.

Figures 2, 3, 4:
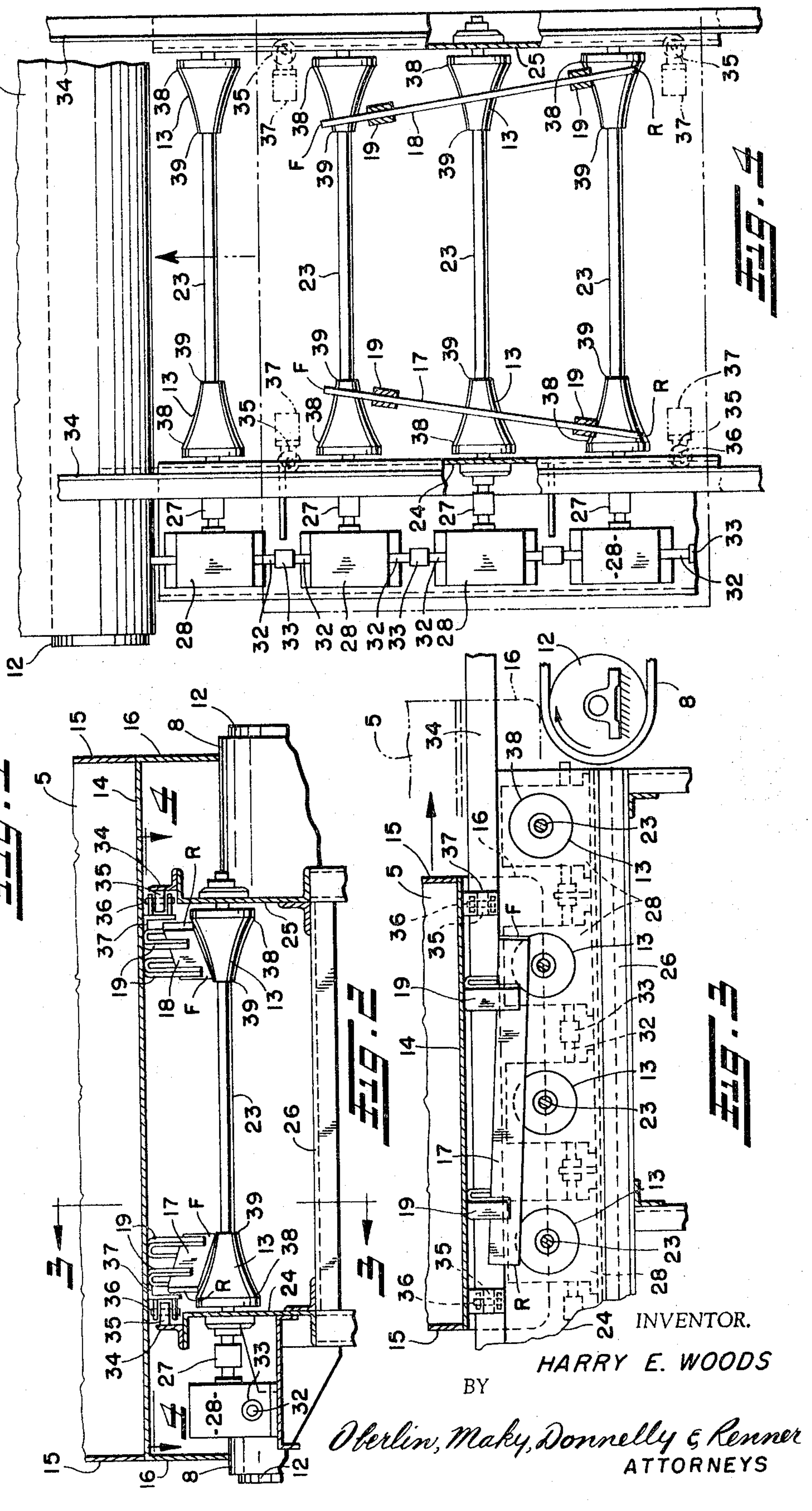
FIG. 2 is an enlarged fragmentary sectional view taken along the plane of line 2—2 of FIG. 1.
FIG. 3 is a fragmentary sectional view taken along the plane of line 3—3 of FIG. 2.
FIG. 4 is a fragmentary sectional plan view taken along the plane of line 4—4 of FIG. 2.

As shown in FIGS. 2 and 4, the driving rollers 13 have a substantially conical tapered shape with the diameter of the rollers decreasing from an outer portion 38 to an inner portion 39. Accordingly, the peripheral speed of the roller surface decreases from the outer portion 38 to the inner portion 39. In the acceleration section 2 the supporting rails 17 and 18 are canted so that at the forward ends F the rails engage the driving rollers at the inner portions 39 and at the rearward ends R of the rails 17 and 18, they engage the driving rollers at the outer portions 38. Intermediate the forward ends F and rearward ends R, the rails 17 and 18 engage the driving rollers 13 at positions intermediate the inner portion 39 and outer portion 38.

In this construction the speed of rotation of the driving rollers 13 is increased progressively in the direction of the movement of the platform 14 indicated by the arrows in FIGS. 3 and 4 by means of the speed reducers 28 so that the rollers engaging the rearmost ends R of the rails 17 and 18 are rotating at a faster speed than the rollers engaging the forward ends F of the rails. Even though the rollers 13 are rotating at different speeds the peripheral speed of the roller surfaces engaging the rails 17 and 18 may be kept the same by rotating the rollers at a speed which is inversely proportional to the diameters of the roller portions engaged by the canted rails. For example, a speed of rotation of the rollers 13 at the forward end F of the rails 17 and 18 may be twice the speed of rotation of the rollers 13 at the rearward end R of the rails providing the diameter of the engaged inner portion 39 of the rollers at the forward end F is one-half the diameter of the engaged outer portion 38 of the rollers at the rearward end R of the rails. It can therefore be seen that driving engagement between the rails 17 and 18 and the rollers 13 can be accomplished without any appreciable slippage.

As the platform 14 is moved forward from the position shown in full lines to the position shown in dot-dash lines in FIG. 3, the rails 17 and 18 will engage a new set of rollers 13 traveling at a progressively higher speed. However, with the rollers 13 being driven at speeds inversely proportional to the diameters of the roller surface portions in contact with the rails, the same no-slip relationship will prevail, and this will continue until the flanges 16 engage the high speed section 4 where the belt 8 will receive the cab 5 from the rollers 13 at the desired high speed.

It will be evident that the same concept of changing speed without slippage between the rails 17 and 18 and the rollers 13 can be utilized in the deceleration section 6 simply by tapering the rollers 13 towards the outside so that the inner portions 39 have a greater diameter than the outer portions 38, and the forward end F of the rails 17 and 18 will engage the surface of greater diameter whereas the rearward end R will engage the surface of smaller diameter. The rails 17 and 18 may be tilted upward towards the forward end instead of downward and the rollers 13 at the forward end of the deceleration section 6 may be driven at progressively lower speeds inversely proportional to the diameters of the rail engaging surfaces of the rollers.

Alternatively a second set of deceleration rails may be mounted inwardly of the acceleration rails 17 and 18 to engage deceleration rollers which are inward of the acceleration rollers 13 or, if desired, the acceleration and deceleration rails 17 and 18 may be the same except that instead of being fixedly mounted to the platform 14, they may be connected by a pivotal connection which will permit the rails to be inclined in the direction governed by the position of the platform over the rollers 13.

Figure 5:
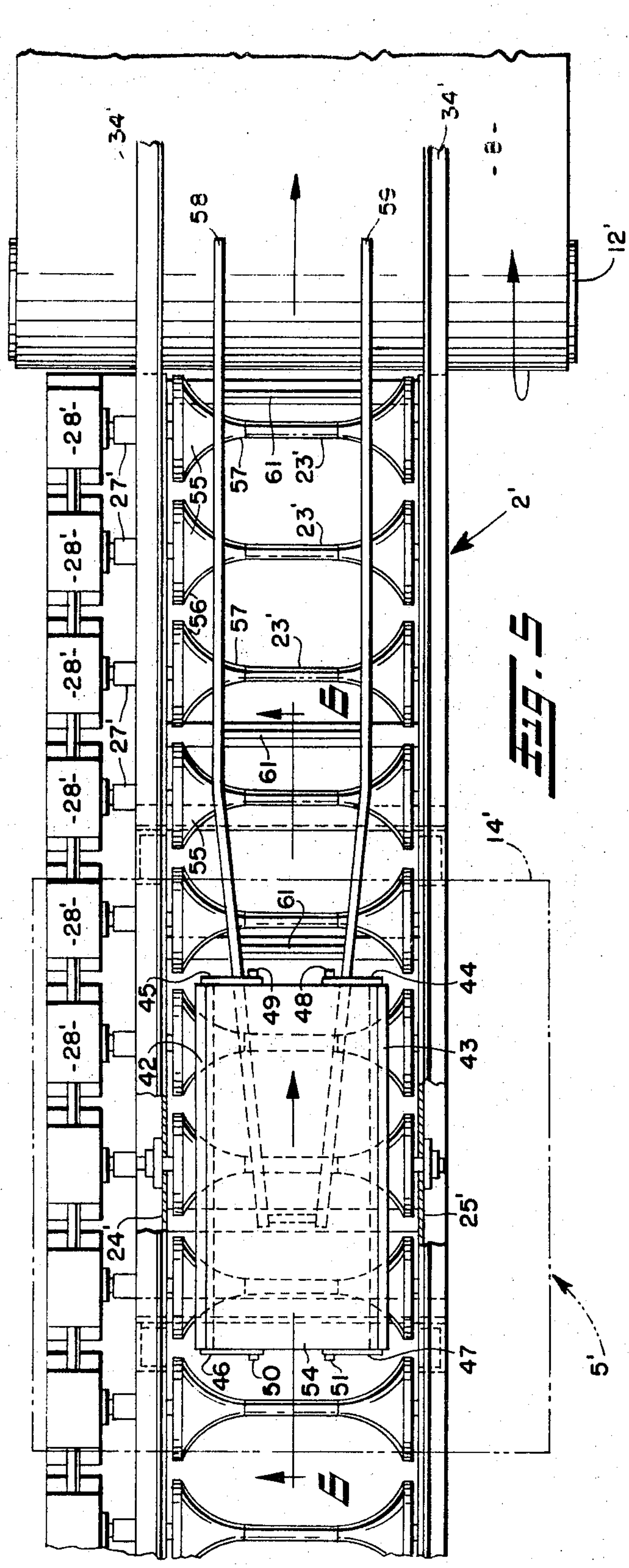
FIG. 5 is a fragmentary sectional plan view like FIG. 4 of a modified variable speed mechanism embodying the invention.
Figure 7:
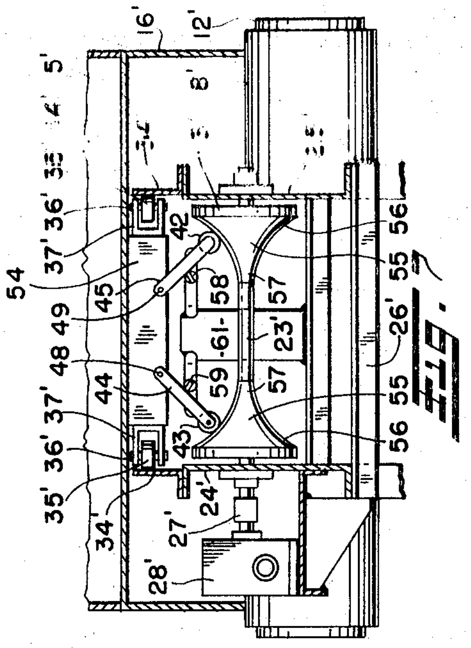
FIG. 7 is a fragmentary transverse sectional view taken along the plane of line 7—7 of FIG. 6.
Figure 6:
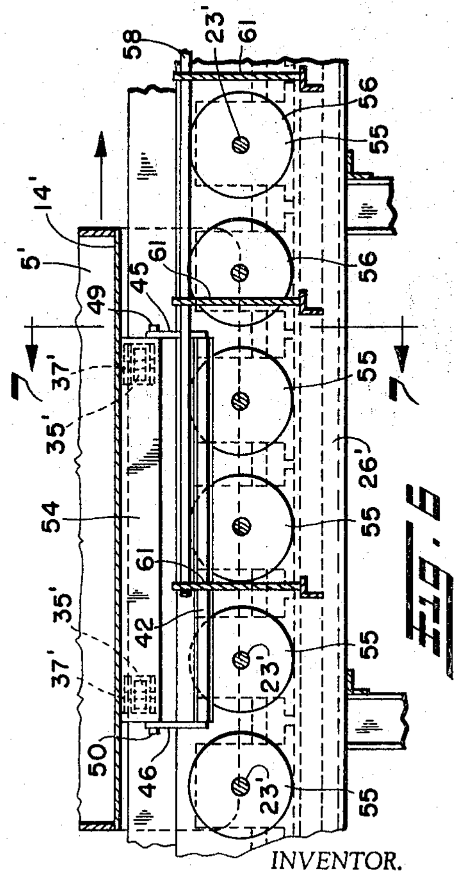
FIG. 6 is a fragmentary longitudinal sectional view taken along the plane of line 6—6 of FIG. 5.

In the modification shown in FIGS. 5, 6 and 7, a supporting platform 14′ has swingable rails 42 and 43 extending longitudinally of the conveyor path and mounted on arms 44, 45, 46 and 47, which are pivoted for transverse swinging movement on pivot pins 48, 49, 50 and 51 respectively fastened to a beam 54 mounted to the underside of the platform 14′. The rollers 42 and 43 may be round rods rotatably secured to the arms 44, 45, 46 and 47, if desired. The beam 54 may also support the pins 36′, brackets 37′ and cam rollers 35′ for constraining the cabs 5′ in the desired transverse position as the cam rollers 35′ engage with the angles 34′ mounted on the channels 24′ and 25′ which are in turn mounted on the supporting frame 26′. The rollers 55 are mounted on shafts 23′ rotatably supported in the channels 24′ and 25′. The shafts are connected to speed reducers 28′ by couplings 27′ and the speed reducers 28′ are driven by a power source such as an electric motor, not shown. The rails 42 and 43 are in supported engagement with the rollers 55 which, as shown in FIG. 5 and FIG. 7, have a substantially conical tapered shape with the diameter at outer portions 56 being greater than the diameter at inner portions 57. Preferably the contour of the surfaces of the rollers 55 conforms with the path of the rails 42 and 43 swinging about pivot pins 48, 49, 50 and 51.

The relative position of the rails 42 and 43 transversely of the conveyor is controlled by guide rods 58 and 59 which are supported on stanchions 61 mounted on the supporting frame 26′. As shown in FIG. 5 in the accelerating section 2′ of the conveyor system 1′, the guide rods 58 and 59 diverge from the position of lower speed to the left to the position of higher speed to the right as shown in FIG. 5. As the guide rods 58 and 59 diverge, they engage the arms 44 and 45 to spread the rails 42 and 43 causing them to engage the outer portions 56 of the rollers 55 which have a greater diameter and therefore a higher peripheral speed.

In this embodiment the shafts 23′ are driven at the same speed through the speed reducers 28′ and therefore the rails 42 and 43 which are in a parallel longitudinal position engage the surfaces of the rollers 55 at the same relative positions between the inner portions 57 and the outer portions 56 whereby all points of engagement of the rails are moved at the same speed by the rollers and the sliding engagement or slippage between the rails and rollers is held to a minimum.

With the construction of this embodiment, deceleration may also be obtained in the deceleration section 6′ of the conveyor system 1′ by receiving the platform from the high speed belt 8′ with the rails 42 and 43 in the spread position and then causing them to swing inwardly by engagement converging with guide rods 58 and 59, whereupon the rails will decelerate from a high speed due to the greater diameter of the engaging surfaces of the rollers 55 at the outer portions 56 to a slower speed due to the smaller diameter of the engaging surfaces of the rollers at the inner portions 57 prior to transfer of the cabs 5' to the low speed section 7' of the conveyor system.

It is also contemplated that with this embodiment the rollers 55 may be driven at progressively higher speeds in the acceleration section through the speed reducers 28' or at progressively lower speeds in the deceleration section 6' if so desired. In this case the rails 42 and 43 need not be held in parallel positions, and through contact of the rods 58 and 59 with the arms 44 and 45 at one end and the arms 46 and 57 at the other end, the rails may be canted to provide engagement with surfaces having the same peripheral speed and thereby reduce slippage in the same manner as outlined and described in the description of the first embodiment shown in FIGS. 2, 3 and 4.

From the foregoing it can now be seen that acceleration and deceleration of the passenger carrying cabs can be obtained smoothly and without appreciable slippage between the rollers and the rails by a relatively simple construction of this invention which may be readily installed and easily maintained on a passenger conveyor system. While certain representative embodiments and details have been shown for the purpose of illustrating the invention, it will be apparent to those skilled in the art that various changes and modifications may be made therein without departing from the spirit or scope of the invention.

I therefore particularly point out and claim as my invention:

1. A transportation system comprising a supporting means for movement longitudinally along a predetermined path, a rotatable driving roller extending in a generally transverse direction of said path and having a surface with a diameter varying axially thereof, rail means having a width less than the axial length of said surface of the roller, said rail means being mounted on said supporting means for engaging different portions of said surface of said roller, means for constraining transverse movement of said supporting means, and means to change the driven speed of said supporting means by engagement of said rail means with said different portions of said surface at different axial positions along said roller.

2. A transportation system according to claim 1 wherein said driving roller is mounted for rotation about an axis extending transversely of said path, said surface of said driving roller being tapered from a larger diameter to a smaller diameter in a direction transversely of said path, said rail means further comprising a rail extending in a direction generally longitudinal of said path, said rail being canted so that one end is engageable with said surface of said driving roller having a smaller diameter and the other end is engageable with said surface of said driving roller having a larger diameter whereby the speed of said supporting means is varied according to the peripheral speed of said portions of said surface along the roller engaged by said rail.

3. A transportation system according to claim 2 wherein said supporting means comprises a load carrying platform and said means for constraining transverse movement including guide means and said rail being mounted on the underside of said platform for engagement with said portions of said surface of said driving roller over which said platform is moved

4. A transportation system according to claim 3 wherein said guide means is mounted on said platform and engageable with a longitudinal member extending along said path.

5. A transportation system according to claim 1 further comprising a plurality of driving rollers like said driving roller disposed at spaced apart positions and in series along said path for simultaneous engagement of said rail means with two or more of said driving rollers.

6. A transportation system according to claim 5 wherein each of said driving rollers is rotated at a predetermined different driving speed, the surfaces of said rollers being tapered from a portion of greater diameter to a portion of smaller diameter providing portions on the same roller of different peripheral speed and portions of the same peripheral speed on adjacent rollers, and said rail means being mounted on said supporting means for engaging said driving rollers at said portions of the same peripheral speed whereby the slippage between said rail means and said driving rollers due to different driving speeds is minimized.

7. A transportation system according to claim 6 wherein each of said driving rollers is rotated at a progressively changing speed along said path and said rail means are mounted in a canted position for engagement with said portions of greater diameter of said rollers rotating at a slower speed and for engagement with said portions of smaller diameter of said rollers rotating at a higher speed whereby the peripheral driving speed of said rollers will be the same.

8. A transportation system according to claim 7 wherein said means to constrain transverse movement of said supporting means includes guide means mounted on said supporting means.

9. A transportation system according to claim 8 wherein as said driving rollers of progressively changing speed move said supporting means along said path, the driven speed of said supporting means is changed as said canted rail means engages said rollers at different axial positions.

10. A transportation system according to claim 6 wherein said rail means extends longitudinally of said path and is mounted on said supporting means for movement transversely of said path for engagement with said rollers at different positions axially thereof to change the speed of said supporting means.

11. A transportation system according to claim 10 wherein said driving rollers are rotated at the same speed and said rail means is swingably mounted to move axially along said surfaces of said rollers to change the speed of said supporting means and means for moving said rail means to provide the desired speed change of said supporting means.

12. A transportation system according to claim 10 wherein said means for moving said rail means comprises a spreading member extending longitudinally of said path and slideably controlling the swinging movement of said rail means.

13. A transportation system according to claim 5 wherein said rail means includes a pair of rails extending longitudinally beneath said supporting means, and said means for constraining transverse movement of said supporting means further comprises the surfaces of said driving rollers being symmetrically tapered from the longitudinal center of said rollers toward the ends whereby said pair of rails in engagement with said rollers will guide said supporting means longitudinally along said path with lateral restraint.

14. A speed changing apparatus comprising a driven member movable longitudinally along a predetermined path, a driving roller extending in a generally transverse direction of said path and having a surface with a diameter varying axially thereof, rail means having a width less than the axial length of said surface of the roller, said rail means being mounted on said driven member for engagement with different portions of said surface axially along said driving roller, means to constrain transverse movement of said driven member and means to change the driven speed of said driven member by engagement of said rail means with said different portions of said surface along said roller.

15. A speed changing apparatus according to claim 14 wherein said apparatus further comprises a plurality of driving rollers like said driving roller disposed in spaced-apart positions for simultaneous engagement of said rail means with two or more of said driving rollers.

16. A speed changing apparatus according to claim 15 wherein each of said driving rollers is rotated at a predetermined different driving speed, the surfaces of said rollers being tapered from a portion of greater diameter to a portion of smaller diameter providing portions on the same roller of different peripheral speeds and portions of the same peripheral speeds on adjacent rollers and said rail means being mounted on said driven member for engaging said driving rollers at said portions of the same peripheral speed whereby the slippage between said rail means and said driving rollers due to different driving speeds is minimized.

17. A speed changing apparatus according to claim 16 wherein adjacent driving rollers are rotated at progressively changing speeds and said rail means are mounted in a canted position for engagement with said portions of greater diameter of said rollers rotating at a slower speed and for engagement with said portions of smaller diameter of said rollers rotating at a higher speed.

* * * * *

PO-1050
(5/69)

UNITED STATES PATENT OFFICE
CERTIFICATE OF CORRECTION

Patent No. 3,759,188 Dated September 18, 1973

Inventor(s) Harry E Woods

It is certified that error appears in the above-identified patent and that said Letters Patent are hereby corrected as shown below:

Column 3, line 25, substitute --forward-- for "rearmost"; same line, substitute the letter --F-- for the letter "R".

line 27, substitute --rearward-- for "forward"; same line, substitute the letter --R-- for the letter "F".

Column 4, line 17, substitute --rails-- for "rollers".

Signed and sealed this 9th day of April 1974.

(SEAL)
Attest:

EDWARD M.FLETCHER,JR.
Attesting Officer

C. MARSHALL DANN
Commissioner of Patents